UNITED STATES PATENT OFFICE.

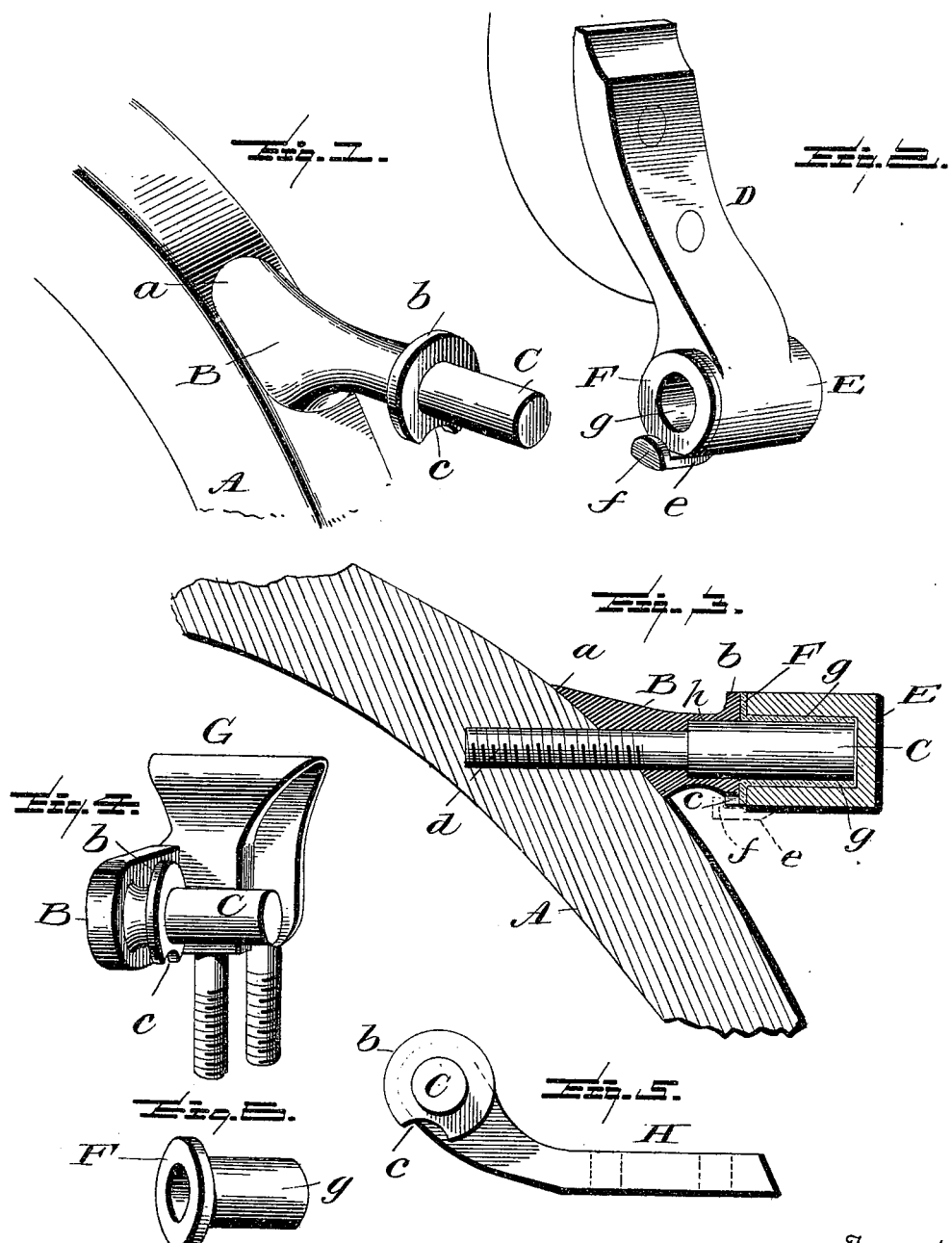

CHARLES EDWIN STONE, OF AMESBURY, MASSACHUSETTS.

THILL-COUPLING.

SPECIFICATION forming part of Letters Patent No. 644,693, dated March 6, 1900.

Application filed October 19, 1899. Serial No. 734,046. (No model.)

*To all whom it may concern:*

Be it known that I, CHARLES EDWIN STONE, a citizen of the United States, residing at Amesbury, in the county of Essex and State of Massachusetts, have invented certain new and useful Improvements in Shaft or Thill Couplings; and I do hereby declare that the following is a full, clear, and exact description of the same, reference being had to the annexed drawings, making a part of this specification, and to the letters of reference marked thereon.

The present invention has relation to couplings for shafts, thills, or the poles of vehicles; and the object thereof is to provide a coupling that will possess strength and durability and at the same time be simple in its construction and readily and conveniently coupled or uncoupled, as found necessary.

The invention consists in a coupling of the above character constructed substantially as shown in the drawings and hereinafter described and claimed.

Figure 1 of the drawings is a perspective view showing a portion of a metal axle with one of the coupling-sections connected thereto; Fig. 2, a perspective view of a thill-iron with the coupling-socket on the end thereof; Fig. 3, a sectional view of the complete coupling, showing the coupling-pin and screw-shank in elevation; Fig. 4, a perspective view of the ordinary axle-clip with my improved coupling-pin thereon; Fig. 5, a side elevation of another well-known form of clip, showing the coupling-pin thereon.

In the accompanying drawings, A represents a portion of a metal axle, and B the tubular bracket, having an extended base $a$ to fit on the axle. The bracket B has a circumferential flange $b$, with notch $c$ at its outer end, and has also a countersink $h$, as shown in Fig. 3 of the drawings. This bracket is preferably of malleable iron, but may be constructed of any metal found most desirable and may be of such shape at its base as to nicely fit the axle.

A coupling-pin C extends into the countersink $h$ and has a screw-threaded shank $d$, said shank being of less diameter than the pin to form a shoulder at the junction of the two to seat itself at the base of the countersink.

The shouldered coupling-pin C is constructed of steel or other preferred metal, and the screw-threaded shank thereof may be of any desirable length to enter a screw-threaded hole or socket in the axle, said shank extending through the bracket, as shown. The outer end of the bracket B being countersunk and the pin C extending therein, a strong and durable joint is obtained between the bracket and pin. After the pin is connected to the bracket and the shank of the pin screwed into the metal axle the whole is brazed together on the axle, thus forming a solid connection between the pin, its screw-shank, the bracket, and the axle.

The shaft or thill iron D may be of any suitable form and construction and is provided at its end with a socket-head E, preferably closed at its outer end, so that it will exclude dirt and grit; but the head may be open at both ends, if found desirable, as I do not wish to be understood as confining myself to either form. The inner end of the socket-head E has a lug $e$, which lug is formed with a locking-lip $f$, extending inwardly and at substantially a right angle to the lug, the lug and lip forming together a locking device to secure the socket-head E on the coupling-pin C.

A washer F, of fiber, leather, or other suitable material, is provided with a tubular extension $g$, adapted to fit in the socket-head E, as shown in Fig. 3 of the drawings. This washer provides an interposed packing between the circumferential flange $b$ and the socket-head E, and the tubular extension $g$ of said washer forms a bushing for the pin C, thereby securing a perfectly-tight connection between the circumferential flange, the coupling-pin, and socket-head.

When the socket-head is engaged with the coupling-pin, said head is turned in the proper direction until the lip $f$ registers with the notch $c$, which will admit the lip being brought back of the flange $b$, and, by further turning the socket-head to a locking position, the pin and socket-head will spring together and form a perfectly-tight coupling that will prevent rattling.

In Figs. 4 and 5 I have shown two of the ordinary forms of clips, which may be provided with the coupling-pin and its notched flange, to take the place of the tubular bracket B, thereby adapting the socket-head, with its locking device, to a coupling-pin upon any of the old and well-known forms of clips.

The washer F, with its tubular extension, provides a perfectly-tight connection and renders the coupling both dust and water proof.

In the construction of the several parts any changes or modifications may be made as would come within ordinary mechanical skill and judgment without in any manner departing from the principle of my invention, and the coupling may be applied to all forms of clips where a pin and socket-head are capable of use.

Having now fully described my invention, what I claim as new, and desire to secure by Letters Patent, is—

1. A shaft or thill coupling, consisting of a coupling-pin, a notched circumferential flange, and a socket-head provided with a lug and locking-lip thereon engaging said flange, substantially as and for the purpose set forth.

2. A shaft or thill coupling, consisting of a coupling-pin and a socket-head having means to engage therewith and lock itself thereto, and a washer having a tubular extension fitting in the socket-head to form a bushing for the pin, substantially as and for the purpose described.

3. A shaft or thill coupling, consisting of a coupling-pin, a circumferential notched flange, and a socket-head with a lug having locking-lip engaging said flange, and a washer with tubular extension fitting in the socket-head, substantially as and for the purpose specified.

4. A shaft or thill coupling, consisting of a tubular bracket, a coupling-pin having a screw-threaded shank extending through said bracket and adapted to screw into the axle, and a socket-head and means for locking the head to the flange, substantially as and for the purpose set forth.

5. A shaft or thill coupling, consisting of a tubular bracket having a countersink upon its outer end and a notched circumferential flange, a coupling-pin having a screw-threaded shank extending through the bracket and adapted to screw into the axle, and a socket-head with lug and locking-lip to engage with the flange, substantially as and for the purpose described.

In testimony that I claim the above I have hereunto subscribed my name in the presence of two witnesses.

CHARLES EDWIN STONE.

Witnesses:
 D. J. MARSTON,
 C. W. JENKINS.